United States Patent
Fisher et al.

(10) Patent No.: US 6,461,458 B1
(45) Date of Patent: Oct. 8, 2002

(54) METHOD OF SEALING A PANEL TO AN AIRCRAFT STRUCTURE

(75) Inventors: David Fisher, Poulton-le-Fylde; Raja S. Abbas, Stockport; John S. Robbens, Preston; Stan Wood, Leyland, all of (GB)

(73) Assignee: BAE Systems plc, Farnborough (GB)

( * ) Notice: Subject to any disclaimer, the term of this patent is extended or adjusted under 35 U.S.C. 154(b) by 70 days.

(21) Appl. No.: 09/585,558

(22) Filed: Jun. 2, 2000

Related U.S. Application Data

(63) Continuation of application No. PCT/GB00/01356, filed on Apr. 11, 2000.

(30) Foreign Application Priority Data

Apr. 20, 1999 (GB) .............................................. 9909065

(51) Int. Cl.$^7$ ................................................ B32B 7/00
(52) U.S. Cl. .......................... 156/92; 156/219; 156/245; 156/293
(58) Field of Search .......................... 49/463, 464, 465, 49/466; 244/121, 129.3, 129.4, 129.5, 131; 156/91, 92, 209, 219, 220, 221, 245, 293, 69; 277/316, 630, 637, 639, 640, 641, 642, 651, 654

(56) References Cited

U.S. PATENT DOCUMENTS

| | | | | |
|---|---|---|---|---|
| 2,140,672 A | * | 12/1938 | Gray et al. .................... | 189/36 |
| 2,576,734 A | | 11/1951 | Voelker | |
| 4,823,229 A | * | 4/1989 | Waterland, III ............. | 361/218 |
| 5,014,934 A | * | 5/1991 | McClaflin .................... | 244/132 |
| 6,056,526 A | * | 5/2000 | Sato .............................. | 425/3 |

FOREIGN PATENT DOCUMENTS

| | | |
|---|---|---|
| EP | 170 300 | 2/1986 |
| EP | 303 102 | 2/1989 |
| EP | 822 357 | 2/1998 |

* cited by examiner

Primary Examiner—Michael W. Ball
Assistant Examiner—Gladys Piazza
(74) Attorney, Agent, or Firm—Pillsbury Winthrop LLP

(57) ABSTRACT

The invention relates to a method of providing a seal between an aircraft structure (14) and a removable panel (26) mountable on the structure to close an opening (12) therein. According to the invention, the method comprises applying a sealant compound (28) for example a polysulphide rubber compound, to one of the structure and the panel, forming a rebate (46) in the sealant compound, and providing a sealant tape (48) to fit within the rebate. Subsequently, the panel is fastened to the structure with the seal (50) comprising the sealant compound and the sealant tape being sandwiched between the structure and the panel and encircling the opening.

5 Claims, 2 Drawing Sheets

METHOD OF SEALING A PANEL TO AN AIRCRAFT STRUCTURE

This is a International Application No. PCT/GB00/01356 filed Apr. 11, 2000 which designated the U.S.

This invention concerns a method and apparatus for providing a seal between an aircraft structure and a removable panel, and an aircraft or aircraft section having such a seal.

In particular, this invention concerns a method of providing a watertight seal between an aircraft structure having an opening therein and a removable panel mountable on the structure to close the opening. The method has particular application in the sealing of interchangeable panels over aircraft chambers containing, for example, fuses and/or other sensitive equipment requiring access for maintenance and service purposes. A particular application is in the sealing of radar bay access panels on aircraft.

Conventionally, it is known to seal radar bay access panels to the surrounding aircraft structure using a polysulphide rubber compound as a sealant between the panel and a portion of the aircraft structure defining an access opening to the radar bay, the panel being attached to the structure by means of fasteners extending through the sealant compound, and grommets.

However, test procedures have established that inadequate sealing is obtained by these means and that water ingress occurs in the spaces between the fasteners. It is thought that this is due to the fasteners compressing the panel against the sealant in their immediate location but having an irregular pitch so that the panel is not properly held against the sealant compound between the fasteners when there is a relatively large spacing between them. Consequently, whilst sufficient sealing may be provided for panels covering for example standard storage spaces or relatively insensitive equipment, such sealing does not meet the requirements for electrical and other sensitive equipment.

Commercial sealant tape is also available but has not hitherto been employed for sealing panels to aircraft structures because the tape does not possess the load bearing characteristics required for such conditions.

According to the present invention, there is provided a method of providing a seal between an aircraft structure and a removable panel mountable on the structure to close an opening therein, comprising:

applying a sealant compound to either the structure or the panel, forming a rebate in the sealant compound, providing a sealant tape to fit within the rebate, and fastening the panel to the structure with the seal comprising the sealant compound and the sealant tape being sandwiched between the structure and the panel and encircling the opening.

The combination of the sealant compound and the sealant tape, has been found to provide a seal which is far superior to the seal obtained by the use of either alone.

Preferably, the sealant compound is applied to the aircraft structure.

In the preferred form of the method described below, the sealant compound is then set or cured and the rebate is formed in the sealant compound at the same time, then subsequently the tape is applied to the rebate.

The sealant compound may be a polysulphide rubber compound.

According to another aspect of the invention, there is provided an aircraft or aircraft section having a structure containing an opening therein, a removable panel for closing the opening, and a seal provided between the panel and the structure, the seal comprising:

a sealant compound surrounding the opening and having a rebate formed therein, and a sealant tape provided in the rebate.

The invention also provides apparatus for providing a seal between an aircraft structure and a removable panel mountable on the structure to close an opening therein, comprising:

means for applying a sealant compound to one of the structure and the panel, means for forming a rebate in the sealant compound, means for providing a sealant tape to fit within the rebate, and means for fastening the panel to the structure with the seal comprising the sealant compound and the sealant tape being sandwiched between the structure and the panel and encircling the opening.

In addition, the invention provides a tool for use in the method, comprising a setting frame for impressing a liquid sealant compound as employed in the method and means for curing the liquid sealant compound, the frame having a substantially continuous forming surface, and a substantially continuous rib upstanding from the forming surface along the full extent thereof.

The invention is described further, by way of example, with reference to the accompanying drawings in which.

Figure 1:
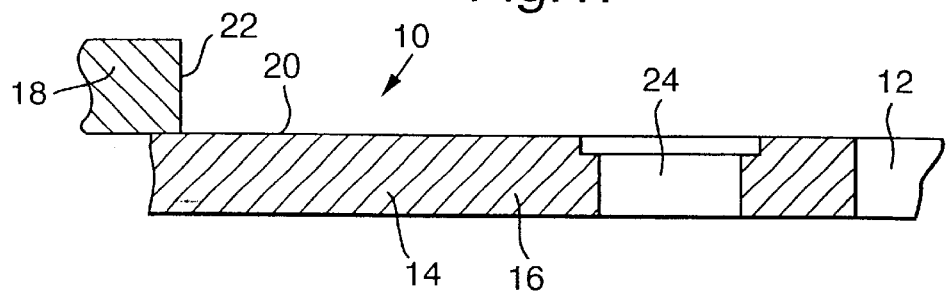
FIG. 1 shows a fragmentary section through an aircraft structure having an opening therein to be closed by a removable panel; and apertures set about the opening.
Figure 7:
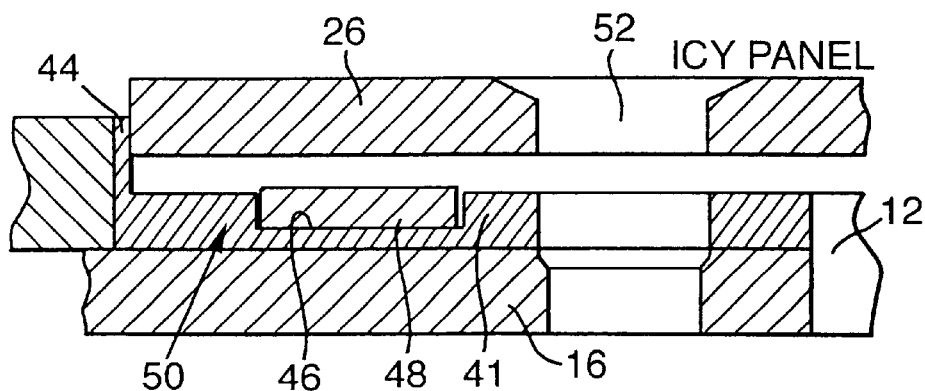
FIG. 7 is a fragmentary section corresponding to FIG. 1 and showing the removable panel about to be fitted to the aircraft structure.

Referring initially to FIG. 1, this shows an aircraft section 10 having therein an opening 12 providing access to a radar bay (not shown) of the aircraft. The aircraft section 10 comprises a structure 14, having a sub-frame 16 defining the opening 12 and a skin 18 set back from the opening 12 so that a surface 20 of the sub-frame 16 is exposed inside an edge 22 of the skin 18. Apertures 24, one of which is shown in FIG. 1, are provided in the exposed area 20 of the sub-frame 16 for receiving fasteners for attaching a panel 26 (shown in FIG. 7) to the structure 14.

In order to ensure a watertight seal in use between the structure 14 and the panel 26, sealing means are provided between them and the method of producing these sealing means is illustrated in FIGS. 2 to 7.

Figure 2:
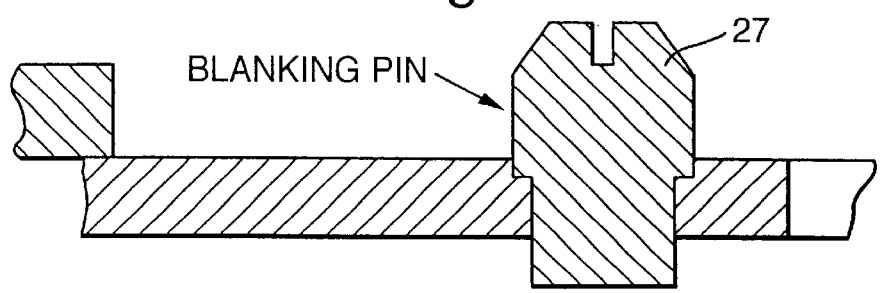
FIG. 2 is a fragmentary section corresponding to FIG. 1 and showing a blanking pin applied to a respective aperture.

In the first step of the sealing method illustrated in FIG. 2, a respective blanking pin 27 is fitted in the illustrated opening 24, the blanking pin 27 having been treated with release agent before use.

Figure 3:
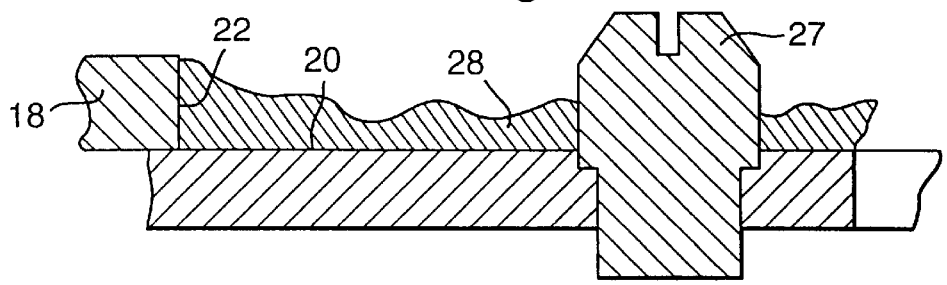
FIG. 3 is a fragmentary section corresponding to FIG. 1 and showing uncured sealant applied to the aircraft structure about the opening.

In the second step of the sealing method illustrated in FIG. 3, a liquid sealant compound 28 is applied over the full surface 20 of the sub-frame 16 encircling the opening 12 inside the edge 22 of the skin 18. The liquid sealant compound 28 flows over this surface 20 in order to cover it fully, but the blanking pins 27 prevent the liquid sealant compound from entering the apertures 24. In the present instance, a polysulphide rubber compound is used for the sealant compound.

Figure 4:
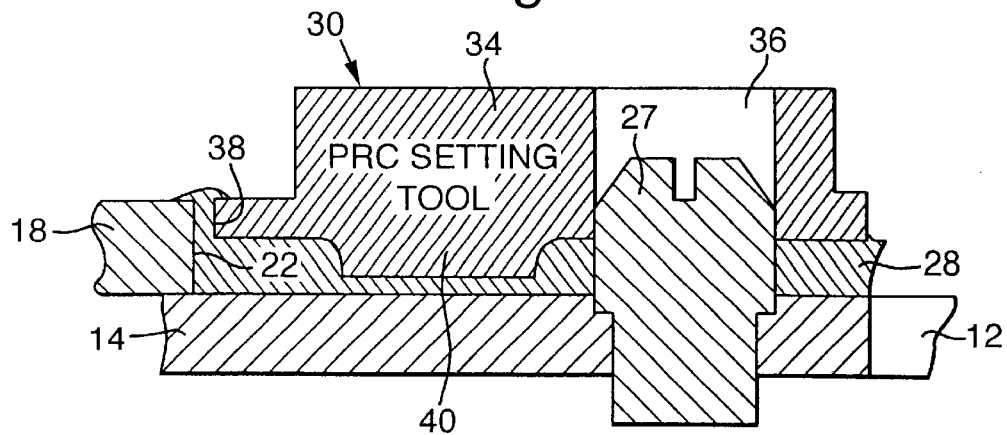
FIG. 4 is a fragmentary section corresponding to FIG. 1 and showing a setting tool being applied to the sealant compound.

In the next step of the method, illustrated in FIG. 4, a setting tool 30 is applied to the surface of the liquid sealant compound 28 in order both to cure the sealant compound and to form the compound into a suitably shape for sealing purposes. The setting tool 30 is also treated with a release agent before use, and either an external heat sauce or heating means within the setting tool 30 may be used to accelerate curing.

As shown in FIG. 4, the setting tool comprises an open metal frame 34 having a profile corresponding to that portion 20 of the structure 14 surrounding the opening 12 and having therein a plurality of apertures 36 corresponding to the apertures 24 in the structure 14 and arranged to fit over the blanking pins 27. An outer surface 38 of the setting tool 30 is of marginally smaller dimensions than the spacing between opposed portions of the edge 22 of the skin 18 for reasons set out below. In addition, the setting tool 30 has an upstanding rib 40 extending all the way round the frame 34, also for reasons set out below.

Figure 5:
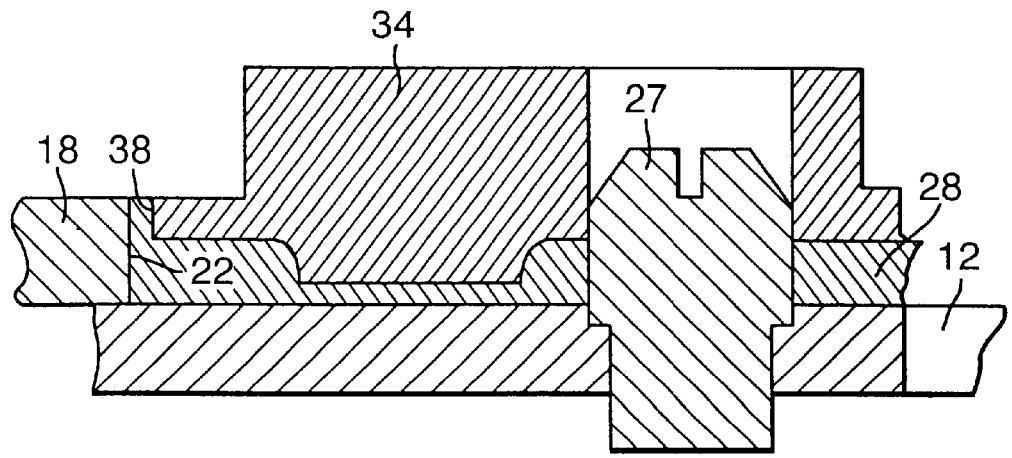
FIG. 5 is fragmentary section corresponding to FIG. 1 and showing the sealant compound in the course of being trimmed.

When the setting tool 30 is applied to the liquid sealant compound 28, those portions of the compound which are heated are impressed and cured and become set. The remaining portions of the compound in the region of the opposed surfaces 22, 38 of the skin 18 and tool 34 and adjacent the opening 12 are subsequently trimmed away as illustrated in FIG. 5.

Figure 6:
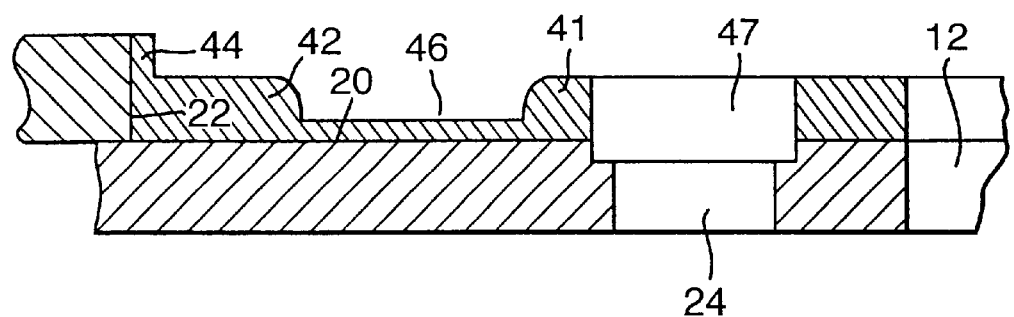
FIG. 6 is a fragmentary section corresponding to FIG. 1 and showing the sealant compound ready for use in a seal.

After this, the setting tool 34 and blanking pins 27 are removed to leave a sealing element 41, as illustrated in FIG. 6, which has a land 42 covering the surface 20 of the sub-frame 16 surrounding the opening 12, and an upstanding rim 44 flanking the edge 22 of the skin 18. A continuous rebate 46 is formed in the sealing element 41 by the rib 40 of the setting tool 30, and extends all the way around the opening 12. Apertures 47 are also provided in register with the apertures 24, through the use of the blanking pins 27.

Next, a sealant tape 48 having an integral adhesive surface is fitted to the rebate 46 along the full extent of its length. The sealant tape 48 consequently encircles the opening 12 completely, and the sealing element 41 and sealant tape 48 together provide a seal 50 around the opening 12. It is to be noted that the upper surface of the sealant tape 48 is raised a little relative to the adjacent surface of the sealing element 41.

Next, the panel 26 is applied to the aircraft structure 14 as shown. The removable panel 26 is sized to be an interference fit within the upstanding rim 44 of the sealing element 41, and is formed with apertures 52 corresponding to the apertures 24 in the sub-frame 16 designed to receive fasteners (not shown). As the panel 26 is lowered onto the structure 14, it first comes into contact with the raised surface of the sealant tape 48 and then compresses the sealant tape 48 and also the sealing element 41. The fastening means applied between the panel 26 and the sub-frame 16 maintain this compressed state of the sealant tape 48 and the sealing element 41 and ensure that a watertight seal 50 is provided between the panel 26 and the aircraft structure 14.

Experimental tests have demonstrated that a good watertight seal adequate load bearing capabilities in normal aircraft conditions can be obtained by the combination of the sealing element 41 and the sealant tape 48, whereas neither one on its own is sufficient to the task.

A number of modifications are possible in the described method. For example, the sealant tape can be applied initially to the panel 26 rather than to the sealing element 41, so long as it is aligned with the rebate 46 in the sealing element 41. The effect will be the same once the panel 26 has been fitted to the structure 14.

Another possibility is for the sealant compound 28 to be applied to the panel 26 in the first instance, and for the setting tool 30 to cure the compound on the panel 26. A rebate 46 is then conveniently provided in the same manner as before, and sealant tape 48 may be applied either directly to the rebate 46 of the cured sealing element 41 or indirectly during the assembly of the panel 26 to the aircraft structure 14.

In the described embodiment of the method, the sealant compound 28 may be set or cured by heating but alternative setting means, for example chemical, may also be employed.

The sealing compound in the method described above is a standard polysulphide rubber compound, but other sealant compounds may also be employed.

What is claimed is:

1. A method of providing a seal between an aircraft structure and a removable panel mountable on the aircraft structure to close an opening therein, comprising:

applying a sealant compound to one of the aircraft structure and the removable panel, forming a rebate in the sealant compound, providing a sealant tape to fit within the rebate, and fastening the removable panel to the aircraft structure with a seal comprising the applied sealant compound and the sealant tape being sandwiched between the aircraft structure and the removable panel and encircling the opening.

2. A method according to claim 1 comprising setting the applied sealant compound before applying the sealant tape to the rebate, and applying the sealant tape to the rebate in the sealant compound before fastening the removable panel to the aircraft structure.

3. A method according to claim 1 wherein the sealant compound is applied to the aircraft structure around the opening, the aircraft structure comprising a sub-frame defining the opening and a skin set back from the opening, and the sealant compound being applied to the sub-frame to form a land about the opening and an upstanding rim flanking an edge of the skin.

4. A method according to claim 3 wherein the removable panel is receivable within the rim of the sealant compound so as to be contiguous with the skin.

5. A method according to claim 1 further comprising forming fastener openings in the applied sealant compound for receiving fastening means for fastening the removable panel to the aircraft structure.

* * * * *